P. KENNEDY.
ELECTRIC SWITCH.
APPLICATION FILED OCT. 26, 1908. RENEWED DEC. 6, 1911.
1,019,484.
Patented Mar. 5, 1912.
2 SHEETS—SHEET 1.
Fig. 1,
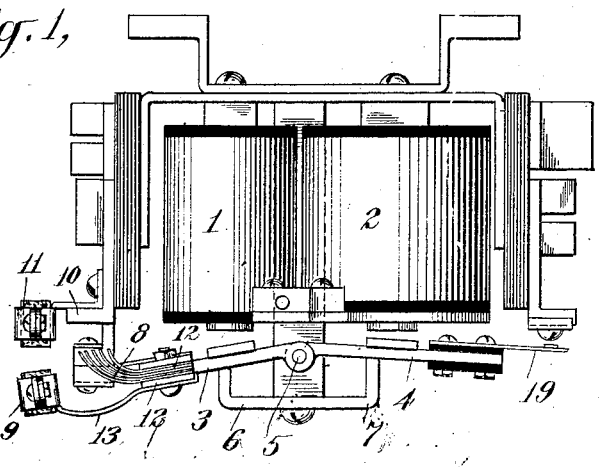
Fig. 2,
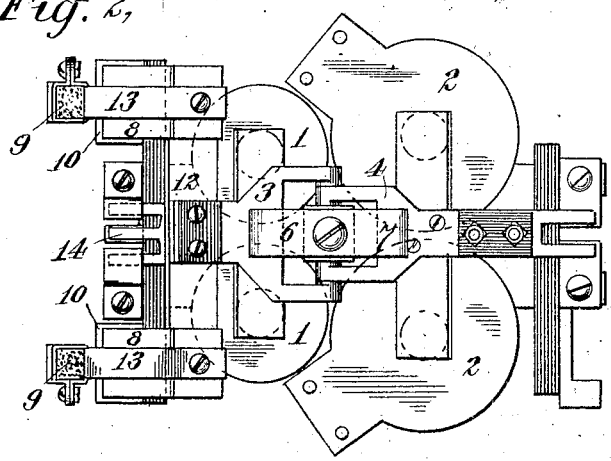
Fig. 3,
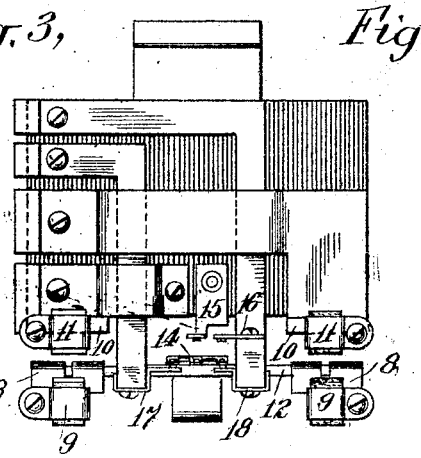
Fig. 4,
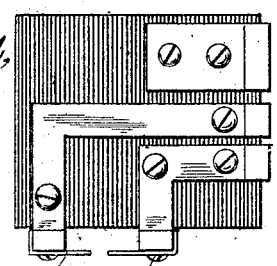
WITNESSES:
INVENTOR
Patrick Kennedy
BY
ATTORNEYS

UNITED STATES PATENT OFFICE.

PATRICK KENNEDY, OF NEW YORK, N. Y.

ELECTRIC SWITCH.

1,019,484.  Specification of Letters Patent.  Patented Mar. 5, 1912.

Application filed October 26, 1908. Serial No. 459,484.  Renewed December 6, 1911. Serial No. 664,278.

*To all whom it may concern:*

Be it known that I, PATRICK KENNEDY, a citizen of the United States, residing in the borough of Brooklyn, city, county, and State of New York, have invented certain new and useful Improvements in Electric Switches; and I do hereby declare the following to be a full, clear, and exact description of the invention, such as will enable others skilled in the art to which it appertains to make and use the same.

The primary object of the invention is to provide a switch, to be employed in a circuit feeding lamps or other translating devices, and which shall be effective to close the main feeding circuit whenever any local switch is closed to supply energy to any one of the individual translating devices, and to hold the circuit closed so long as any of the translating devices are taking current, and which shall open automatically as soon as all of the local switches are opened. Furthermore, it is often necessary or desirable to employ, in connection with a supply current, a regulating device for regulating the output of the generator, such, for example, as the motor-driven regulator of my Patents Nos. 745,194 of November 24, 1903, and 800,114 of September 19, 1905, or any other current-operated regulating device. In case such a regulator is used my improved switch preferably controls also the circuit of the motor or other current-operated portion of the regulator.

Figure 5:
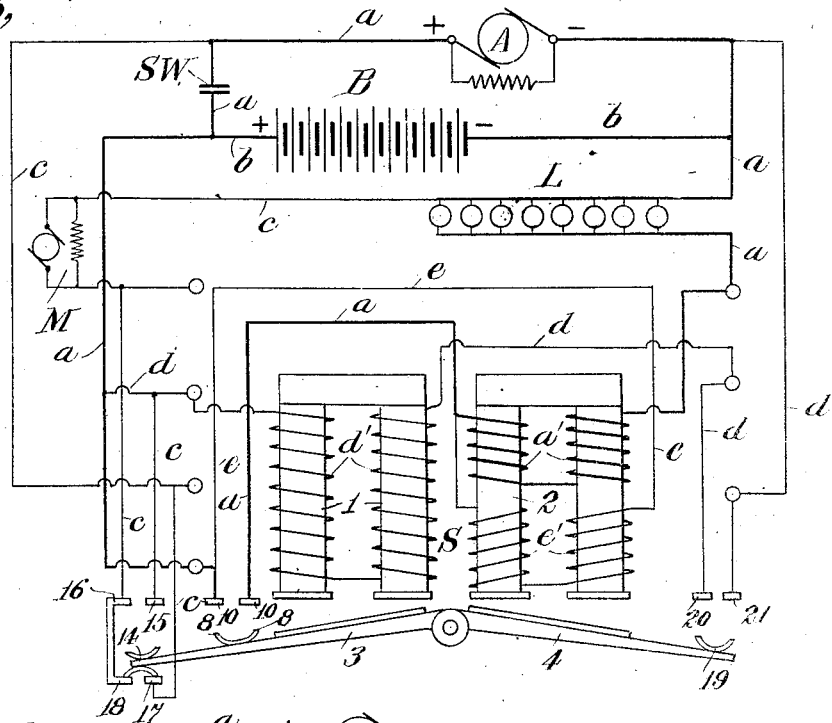
Figure 6:
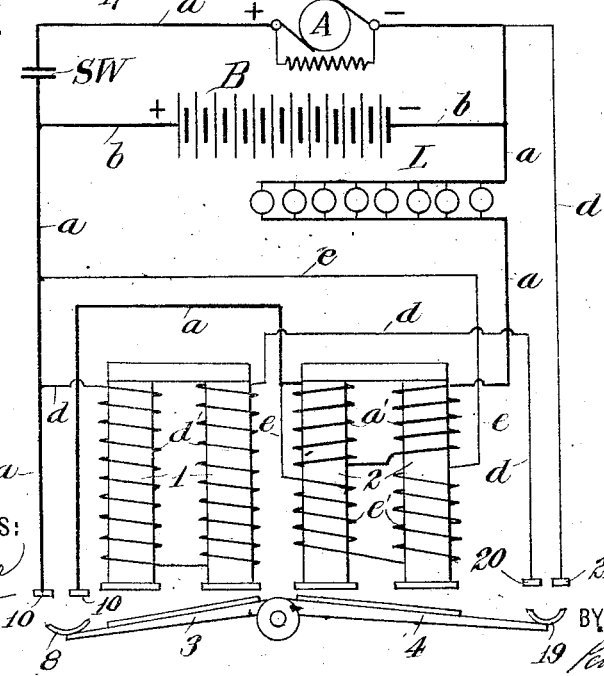

The objects of my invention are accomplished by means of the apparatus illustrated in the accompanying drawings, in which:

Figure 1 is a side elevation of my improved switch; Fig. 2 is a bottom plan view; Fig. 3 is an elevation of the left-hand end of Fig. 1; Fig. 4 is an elevation of the right-hand end of Fig. 1; Fig. 5 is a diagram of circuit connections including the motor of the regulator of my patents above named; and Fig. 6 is a diagram without the regulator-motor.

The switch comprises two magnets 1 and 2, the armatures of which are respectively attached to the switch lever-arms 3 and 4, independently pivoted on shaft 5 and limited in their movement away from the magnets by stops 6 and 7. Lever arm 3 carries a pair of main and follower contacts 8, 9 coacting with corresponding stationary terminals 10, 11 on the switch. The two brush contacts 8 are electrically connected by cross-pieces 12, and they are also connected electrically to the carbon follower contacts 9 by springs 13. Main contacts 8 close the feeding circuit when magnet 1 is excited, and follower contacts 9 serve the usual purpose of taking the spark. Lever-arm 3 also carries a three-pronged contact plate 14, which, when magnet 1 is excited, connects terminal 15 to terminal 16, and, when magnet 1 is not excited, connects terminal 17 to terminal 18. This contact plate 14, and terminals 15, 16, 17 and 18 control the circuit of the regulator motor as will be described in connection with Fig. 5. Lever-arm 4 carries contact plate 19 which, when magnet 2 is excited connects terminal 20 to terminal 21, to excite magnet 1 through the circuits which will now be described.

Referring to Fig. 5, the heavy line *a* represents the main feeding circuit extending from generator A through switch contacts 8 and terminals 10, series coil *a'* on magnet 2, and lamps L. This circuit also includes a potential operated circuit-breaker SW which is arranged to close the generator circuit automatically when the generated electromotive force has risen sufficiently to warrant the connection of the generator to the feeding circuit, and to open automatically whenever the electromotive force falls below that point. This may be accomplished in various ways well known to electrical engineers, as, for example, in the manner described in my patents above mentioned. Circuit *b* is connected across circuit *a* and includes storage battery B. Circuit *c* is a shunt across main circuit *a*, and includes contact plate 14 and switch terminals 17, 18 or 15, 16, depending upon the position of lever-arm 3, and regulator-motor M. Circuit *d* is a shunt across the main feeding circuit *a* and includes coils *d'* of magnet 1, switch terminals 20 and 21 and contact plate 19. Circuit *e* is a high-resistance shunt from the main circuit *a* about main terminals 10—10 of the switch.

With the parts in the position shown in Fig. 5 no lamps are burning and, as soon as the electromotive force of generator A rises to the proper point to close circuit-breaker SW, current will flow into the storage battery, and at the same time motor M will be excited, to effect the regulation, through circuit *c*, switch terminals 17, 18 and plate 14. If the electromotive force of the generator falls below the critical point switch SW will open and the charge to the storage battery will stop. If now any one of the lamps on the feeding circuit is turned on current will flow from the generator, or storage-battery if the generator is not running, through circuit a, and circuit e including high resistance coils e' on magnet 2, and through coils a' on magnet 2, through the lamp and back to the negative terminal of the generator or storage-battery. This current excites magnet 2 and brings contact plate 19 into position to connect switch terminals 20 and 21. Current will then flow through shunt d, including coils d' of switch magnet 1 exciting that magnet, which will attract its armature to lift lever-arm 3 and close the main lamp circuit 10—10. Current then flows in full volume to the lamps and series coils a' hold lever-arm 4 up so long as current flows to the lamps. At the same time contact is broken at switch terminals 17—18 and closed at 15—16 thereby transferring motor M from the generator circuit to the battery circuit. By virtue of this arrangement current will flow to motor M whenever the generator is running and whenever current is flowing to the lamps, whether the generator is running or not. The motor will thus perform its regulating action whenever the generator or storage battery is giving current, but will stop when the generator is stopped and no current is flowing to the lamps. As soon as all the lamps are turned off lever-arm 4 will fall and the parts will return to the positions shown in Fig. 5.

The diagram Fig. 6 is identical with Fig. 5, with the exception that the connections of regulator-motor M are omitted. It illustrates the connections when no current-actuated regulator is used, and will be readily understood from the foregoing description.

What I claim is:

1. A switch for electric current-supply circuits, comprising main terminals and coöperating contacts controlling the main circuit, a shunt about said terminals including a magnet, a supplemental circuit controlled by said magnet, mechanism included in said supplemental circuit for controlling said main contacts, and an exciting coil on said first-named magnet included in series with the main circuit.

2. A switch for electric-supply circuits, comprising a magnet, a lever arm controlled by said magnet and carrying a contact plate, main circuit terminals coöperating with said contact plate, a second magnet, a lever arm controlled by the second magnet and carrying a second contact plate, supplemental terminals coöperating with the second contact plate, a coil on the second magnet shunted across the main circuit terminals, a second coil on the second magnet in series with the main circuit, and a coil on the first magnet the circuit of which is controlled by the second contact terminals and the second terminal plate.

3. A switch for electric-supply circuits, comprising a magnet, a lever arm controlled by said magnet and carrying a contact plate, main circuit terminals coöperating with said contact plate, a second magnet, a lever arm controlled by the second magnet and carrying a second contact plate, supplemental terminals coöperating with the second contact plate, a coil on the second magnet shunted across the main circuit terminals, a second coil on the second magnet in series with the main circuit, a coil on the first magnet the circuit of which is controlled by the second contact terminals and the second terminal plate, another contact plate on one of said lever arms, and circuit terminals coöperating with the last named contact plate in the opened or the closed position of the last named lever arm.

In testimony whereof I affix my signature, in presence of two witnesses.

PATRICK KENNEDY.

Witnesses:
 WILLIAM H. DAVIS,
 LAURA B. PENFIELD.